United States Patent [19]
Wold et al.

[11] Patent Number: 5,911,959
[45] Date of Patent: Jun. 15, 1999

[54] METHOD FOR PURIFICATION AND PRODUCTION OF SALINE MINERALS FROM TRONA

[75] Inventors: John S. Wold, Casper, Wyo.; Wayne C. Hazen, Denver, Colo.; Rudolph Pruszko, Green River, Wyo.; Roland Schmidt, Lakewood; Dale Lee Denham, Jr., Louisville, both of Colo.

[73] Assignee: Environmental Projects, Inc.

[21] Appl. No.: 08/967,281

[22] Filed: Nov. 7, 1997

Related U.S. Application Data

[63] Continuation of application No. 08/373,955, Jan. 17, 1995, abandoned, which is a continuation-in-part of application No. PCT/US94/05918, May 25, 1994, and application No. 08/066,871, May 25, 1993, Pat. No. 5,470,554.

[51] Int. Cl.⁶ .............................. C01D 7/00; C22B 26/10
[52] U.S. Cl. ..................... 423/206.2; 423/421; 23/302 T
[58] Field of Search ................. 423/206.2, 421; 23/302 T

[56] References Cited

U.S. PATENT DOCUMENTS

| | | | |
|---|---|---|---|
| 2,792,282 | 5/1957 | Pike | 23/38 |
| 2,887,360 | 5/1959 | Hoekje | 423/192 |
| 2,970,037 | 1/1961 | Caldwell et al. | 23/63 |
| 2,981,600 | 4/1961 | Porter | 23/143 |
| 3,233,983 | 2/1966 | Bauer et al. | 23/300 |
| 3,244,476 | 4/1966 | Smith | 23/63 |
| 3,479,133 | 11/1969 | Warzel | 23/63 |
| 3,498,744 | 3/1970 | Frint et al. | 423/206.2 |
| 3,655,331 | 4/1972 | Seglin et al. | 423/206.2 |
| 3,705,790 | 12/1972 | Garofano et al. | 23/302 |
| 3,717,698 | 2/1973 | Ilardi et al. | 423/206 |
| 3,796,794 | 3/1974 | Ilardi et al. | 423/421 |
| 3,819,805 | 6/1974 | Graves et al. | 423/206 |
| 3,836,628 | 9/1974 | Ilardi et al. | 423/206 |
| 3,845,119 | 10/1974 | Duke et al. | 260/527 |
| 3,869,538 | 3/1975 | Sproul et al. | 423/206 |
| 3,904,733 | 9/1975 | Gancy et al. | 423/206 |
| 3,933,977 | 1/1976 | Ilardi et al. | 423/206 |
| 3,956,457 | 5/1976 | Port et al. | 423/206.2 |
| 4,021,526 | 5/1977 | Gancy et al. | 423/206.2 |
| 4,021,527 | 5/1977 | Baadsgaard | 423/206 |
| 4,083,939 | 4/1978 | Lobunez et al. | 423/421 |
| 4,138,312 | 2/1979 | Gill et al. | 162/30 |
| 4,183,901 | 1/1980 | Ilardi et al. | 423/206 |
| 4,202,667 | 5/1980 | Conroy et al. | 23/302 |
| 4,283,277 | 8/1981 | Brison et al. | 209/166 |
| 4,288,419 | 9/1981 | Copenhafer et al. | 423/190 |
| 4,299,799 | 11/1981 | Ilardi et al. | 423/206 |
| 4,341,744 | 7/1982 | Brison et al. | 423/206 |
| 4,363,722 | 12/1982 | Dresty et al. | 209/3 |
| 4,374,102 | 2/1983 | Connelly et al. | 423/206 |
| 4,375,454 | 3/1983 | Imperto et al. | 423/206 |
| 4,472,280 | 9/1984 | Keeney | 210/666 |
| 4,512,879 | 4/1985 | Attia et al. | 209/3 |
| 4,781,899 | 11/1988 | Rauh et al. | 423/206 |
| 4,814,151 | 3/1989 | Benke | 423/206 |
| 4,943,368 | 7/1990 | Gilbert et al. | 209/2 |
| 5,096,678 | 3/1992 | Mackie | 423/27 |
| 5,238,664 | 8/1993 | Frint et al | 423/206.2 |
| 5,470,554 | 11/1995 | Schmidt et al. | 423/206.2 |

OTHER PUBLICATIONS

Trona Soda Ash, Chemical Engineering, May, 1953, pp. 118, 120.

Perry, Chilton and Kirkpatrick, Chemical Engineers Handbook, 4th Ed. 1963, pp. 21–61 to 21–70, no month.

Soda Ash Production Keeps Booming, Chemical Engineering, Jul. 3, 1967, pp. 60, 62.

Perry & Chilton and Kirkpatrick, Chemical Engineers' Handbook, 5th Ed. 1973, pp. 8–31, no month.

D. Muraoka, Monohydrate Process for Soda Ash from Wyoming Trona, Minerals and Metallurgical Processing, May, 1985, pp. 102–103.

S. E. Clay, Kinetic Study of the Dissolution of Calcined Trona Ore in Aqueous Solutions, Minerals and Metallugical Processing, Nov., 1985, pp. 236–240.

American Society for Testing and Materials, Standard Test Methods for Chemical Analysis of Soda Ash (Sodium Carbonate), E–359–90, Mar., 1990, pp. 403–410.

*Primary Examiner*—Steven Bos
*Attorney, Agent, or Firm*—Sheridan Ross P.C.

[57] ABSTRACT

Disclosed are a variety of processes for the purification of saline minerals and in particular, trona. Some of the processes include a combination wet and dry recovery process which results in high recovery and purification at relatively low cost. The dry separation methods can include density separation, magnetic separation and electrostatic separation. Other processes include a modified slush process for the purification of calcined trona (sodium carbonate) by the introduction of anhydrous sodium carbonate into a saturated brine solution and subsequent separation of insoluble impurities.

19 Claims, 3 Drawing Sheets

METHOD FOR PURIFICATION AND PRODUCTION OF SALINE MINERALS FROM TRONA

REFERENCE TO RELATED APPLICATIONS

This is a continuation of application Ser. No. 08/373,955, filed on Jan. 17, 1995 now abandoned, which is a continuation-in-part of U.S. patent application Ser. No. 08/066,871, filed May 25, 1993, now U.S. Pat. No. 5,470,554, and a continuation-in-part of PCT Application No. US94/05918, filed May 25, 1994.

FIELD OF THE INVENTION

The present invention relates generally to the beneficiation of saline minerals and, more specifically, trona. The invention further relates to a combination dry and wet process for recovering saline minerals from an ore containing saline minerals and impurities, and an enhanced wet process for beneficiating saline minerals.

BACKGROUND OF THE INVENTION

Many saline minerals are recognized as being commercially valuable. For example, trona, borates, potash and sodium chloride are mined commercially. After mining, these minerals typically need to be beneficiated to remove naturally occurring impurities.

With regard to trona ($Na_2CO_3 \cdot NaHCO_3 \cdot 2H_2O$), high-purity trona is commonly used to make soda ash, which is used in the production of glass and paper. Naturally-occurring trona, or crude trona, is found in large deposits in the western United States, such as in Wyoming and California, and also in Egypt, Kenya, Botswana, Tibet, Venezuela and Turkey. Crude trona ore from Wyoming is typically between about 80% and about 90% trona, with the remaining components including shortite, halite, quartz, dolomite, mudstone, oil shale, kerogen, mica, nahcolite and clay minerals.

The glass and paper making industries generally require soda ash produced from trona having a purity of 99% or more. In order to obtain such a high purity, wet beneficiation processes have been used. Such processes generally involve crushing the crude trona, solubilizing the trona, treating the solution to remove insolubles and organic matter, crystallizing the trona, and drying the trona which may subsequently be calcined to produce soda ash. Alternatively, the crude trona can be calcined to yield crude sodium carbonate, which is then solubilized, treated to remove impurities, crystallized and dried to produce sodium carbonate monohydrate.

Not all industries which use trona require such a highly purified form of trona. For example, certain grades of glass can be produced using trona having less than 97% purity. For this purpose, U.S. Pat. No. 4,341,744 discloses a dry beneficiation process which is less complex and less expensive than the above-described wet beneficiation process. Such a dry beneficiation process generally includes crushing the crude trona, classifying the trona by particle size, electrostatically separating certain impurities, and optionally magnetically separating other impurities. Such a process can yield trona having up to about 95% to 97% purity, depending on the quantity and type of impurities present in the crude trona ore.

There are uses for trona, for example, in certain applications in the glass industry, requiring a purity of at least 97%, yet not needing a purity over 99%. The known dry beneficiation processes typically do not consistently produce such a purity. Consequently, these industries generally use trona purified by the more expensive and complex wet beneficiation processes.

Commonly-assigned U.S. patent application Ser. No. 08/066,871, filed May 25, 1993, now U.S. Pat. No. 5,470,554, which is incorporated herein by reference in its entirety, discloses a dry process for beneficiating saline minerals and which achieves purities on the order of about 97% or more. The disclosed process significantly enhances the saline mineral recovery process by producing a low cost, high purity product. However, dry processes may have difficulty in producing higher purities due to the problem of processing fines and/or removing interstitial impurities by a dry process.

Accordingly, it is an object of the present invention to provide a process for the beneficiation of saline minerals and in particular, trona, resulting in higher purities than existing dry beneficiation processes and which is simpler and less expensive than known wet beneficiation processes. It is another object of the present invention to provide an enhanced wet beneficiation process which has advantages over known wet processes.

SUMMARY OF THE INVENTION

The present invention includes a process for the purification of saline minerals having insoluble impurities (e.g., iron-bearing materials, dolomite, shale, searlesite and northupite). In one aspect, the process includes the steps of calcining trona to form sodium carbonate, sizing the feedstream into a large size fraction and a small size fraction, separating the large size fraction into a first recovered portion and a first impurity portion (e.g., comprising halite and shortite) by a dry separation method, separating the first impurity portion into a second recovered portion and second impurity portion by a wet separation method, and separating the small size fraction into a third recovered portion and third impurity portion by a wet separation method. The dry separation method is selected from the group consisting of density separation, magnetic separation, electrostatic separation, and combinations thereof. In addition, the wet separation methods include a dissolution and crystallization process.

In another aspect, the process of the present invention includes the steps of calcining the trona to form sodium carbonate, separating a first portion of the feedstream into a first recovered portion and a first impurity portion by a dry separation method, and separating a second portion of the feedstream into a second recovered portion and second impurity portion by a wet separation method, wherein the second portion comprises particles having a particle size larger than about 100 mesh.

In yet another aspect, the process of the present invention includes the steps of calcining the trona to form sodium carbonate, separating a first portion of impurities by a dry separation method, and separating a second portion of impurities by a wet separation method, wherein at least about 15 wt. % of the feedstream is processed by the wet separation method.

In yet another aspect, the process of the present invention includes the steps of calcining the trona to form sodium carbonate, separating a first portion of impurities by a dry separation method, and separating a second portion of impurities by a wet separation method, wherein an output of the dry separation method comprises at least about 97 weight percent soluble material and at most about 0.1 wt. % iron.

Another aspect of the process includes the steps of calcining trona to produce sodium carbonate, and magnetically separating (e.g., dry magnetic separation) a first portion of impurities from the sodium carbonate. The process can further include the step of density separating a second portion of impurities from the sodium carbonate, preferably also after the calcining step.

In another aspect of the present invention, a modified slush process is provided to enhance recovery of sodium carbonate during wet separation methods. The modified slush process includes the steps of introducing a portion of the sodium carbonate to a saturated sodium carbonate brine solution at a temperature of between about 35° C. and about 112° C., converting the sodium carbonate to monohydrate crystals, and separating at least a portion of the monohydrate crystals from at least a portion of the insoluble impurities, wherein the portion of separated monohydrate crystals includes crystals having a particle size about equal to an average particle size of the insoluble impurities. Preferably, the temperature of the brine solution is between about 35° C. and about 50° C.

In various embodiments of the modified slush process, the step of separating can be a size separation step (e.g., screening), a magnetic separation step, and flotation separation step.

In another aspect, the process includes the steps of introducing sodium carbonate to a saturated sodium carbonate brine solution at a temperature less than about 35° C., converting the sodium carbonate to decahydrate crystals, and separating at least a portion of the decahydrate crystals from at least a portion of the insoluble impurities.

DETAILED DESCRIPTION OF THE INVENTION

Processes of the present invention are designed to recover saline minerals from naturally occurring ores to produce commercially valuable purified minerals. As used in the mineral processing industry, the term "saline mineral" refers generally to any mineral which occurs in evaporite deposits. Saline minerals that can be beneficiated by the present process include, without limitation, trona, borates, potash, sulfates, nitrates, sodium chloride, and preferably, trona.

The purity of saline minerals within an ore depends on the deposit location, as well as on the area mined at a particular deposit. In addition, the mining technique used can significantly affect the purity of the saline minerals. For example, by selective mining, higher purities of saline minerals can be achieved. Deposits of trona ore are located at several locations throughout the world, including Wyoming (Green River Formation), California (Searles Lake), Egypt, Kenya, Venezuela, Botswana, Tibet and Turkey (Beypazari Basin). For example, a sample of trona ore from Searles Lake has been found to have between about 50% and about 90% by weight (wt. %) trona and a sample taken from the Green River Formation in Wyoming has been found to have between about 80 and about 90 wt. % trona. The remaining 10 to 20 wt. % of the ore in the Green River Formation sample comprised impurities including shortite (1–5 wt. %) and halite, and the bulk of the remainder comprises shale consisting predominantly of dolomite, clay, quartz and kerogen, and traces of other impurities. Other samples of trona ore can include different percentages of trona and impurities, as well as include other impurities.

In various embodiments of the present invention, combination dry and wet processes for the production of sodium carbonate are provided. The dry processes can include any known or hereafter developed processes for the dry beneficiation of ores containing saline minerals and in particular, sodium carbonate. Such processes can include density separation, magnetic separation and/or electrostatic separation. The wet processes can include any process which includes dissolution and crystallization.

Figure 1:
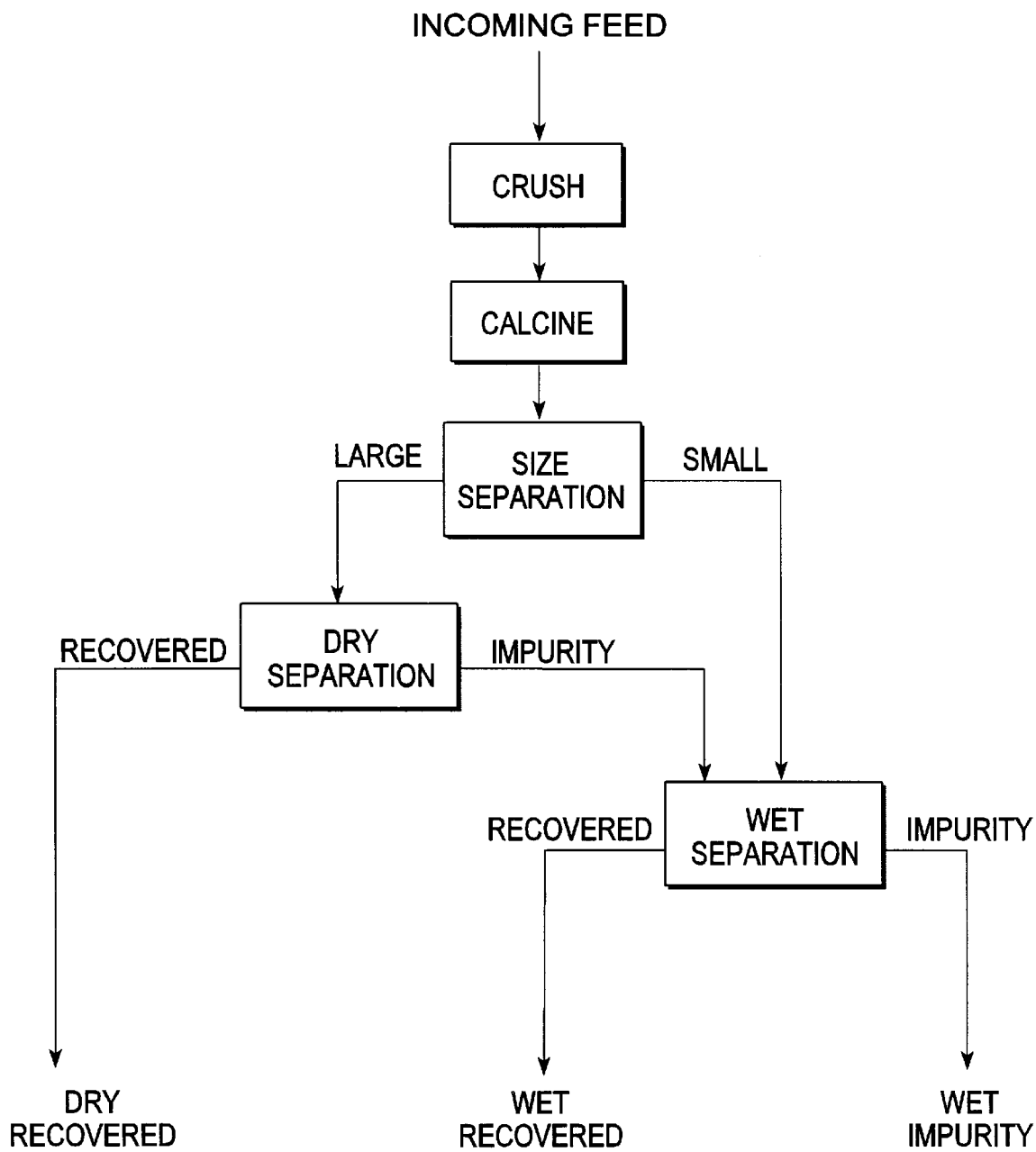
FIG. 1 is a flow diagram illustrating a combined wet and dry separation process of the present invention.

Referring to FIG. 1, one embodiment includes includes the steps of calcining the saline mineral, e.g., trona to form sodium carbonate, and separating the feedstream into a large size fraction (e.g., larger than about 150 mesh, preferably about 100 mesh, and more preferably about 65 mesh) and a small size fraction (e.g., smaller than about 150 mesh, preferably about 100 mesh, and more preferably about 65 mesh). The large size fraction is subsequently separated into a first recovered portion and a first impurity portion by a dry separation method. The first impurity portion from the dry separation method is then separated into a second recovered portion and a second impurity portion by a wet separation method. Similarly, the small size fraction from the size separation process is separated into a third recovered portion and a third impurity portion by a wet separation method.

Prior to various processes of the present invention, ore can be treated by a crushing step to reduce particle size. The crushing step of the present invention can be accomplished by any conventional technique, including impact crushing (e.g., cage or hammer mills), jaw crushing, roll crushing, cone crushing, autogenous crushing or semi-autogenous crushing. Autogenous and semi-autogenous crushing are particularly beneficial because the coarse particles of ore partially act as the crushing medium, thus requiring less cost in obtaining grinding media. Moreover, because saline minerals are typically soft, these methods are suitable for use in the present process. In addition, these two crushing methods allow for the continuous removal of crushed material.

In general, crushing to smaller particle size achieves better liberation of impurities and thus, improved recovery. However, if the particle size after crushing is too fine, there may be adverse effects upon subsequent separation steps. In addition, over-crushing is not needed for many applications of the present invention and merely increases the costs associated with the crushing step. It has been found that acceptable liberation for the present process can be achieved by crushing the ore to less than about 6 mesh.

The calcining step can be performed using any appropriate calcining process. For example, direct heating using a rotary kiln or fluidized bed reactor can be utilized. In a preferred embodiment, the calcining step is performed by an indirect heating process in a calcining vessel such as a fluidized bed reactor at a temperature of at least about 120° C. In the indirect heating process, the combustion gases from the heat source are not in direct fluid communication with the ore containing the saline mineral, but rather provide heat to the ore by conduction through, for example, heating coils. In one embodiment, the calcining occurs at about 140° C. with a 20 minute residence time within a fluidized bed reactor. Other calcining times and temperatures may also be utilized as is known in the art. It should be noted that the calcining step can be performed either before or after the dry separation methods. When magnetic separation and/or density separation is utilized as the separation step, preferably calcination is performed first. When electrostatic separation is utilized as the separation step, preferably calcination is performed after the electrostatic separation step.

The size separation step according to the present invention can include any appropriate size separation process wherein particles larger than a predetermined cut-off size are separated from particles smaller than the cut-off size. For example, the process may include screening or air classification, and preferably includes screening. The desired cut-off size can be determined based upon a number of factors, including the desired final product purity and the relative costs associated with performing the wet separation and dry separation methods. In general, it is desirable to design the process such that the material that goes to wet separation (i.e., the small size fraction and the first impurity stream) comprises at least about 15 weight percent of the original feedstream. Preferably, such weight percent is at least about 20 weight percent, and more preferably at least about 30 weight percent. Suitable cut-off sizes may include 150 mesh, 100 mesh, and preferably 65 mesh. Of course, the actual cut-off size will depend on the desired weight percent going to wet separation and on the size to which the original feed was crushed.

As noted above, the large size fraction from the size separation step is separated into a first recovered portion and a first impurity portion by a dry separation method. For example, the dry separation method may include density separation, magnetic separation, electrostatic separation, and combinations thereof. The dry separation method preferably results in a large recovered portion having a soluble content of at least about 97 weight percent, and further having at most about 0.1 wt. % iron. More preferably, the iron content is at most about 0.08 wt. %, and even more preferably at most about 0.05 wt. %. Each of the above-noted dry separation methods (i.e., density separation, magnetic separation, and electrostatic separation) are described below in more detail.

Density separation methods are based on subjecting an ore to conditions such that materials of different densities physically separate from each other. Thereby, certain impurities having a different density than the desired saline mineral can be separated. Any known density separation technique could be used for this step of the present invention, including air tabling or dry jigging. In density separation, the incoming mineral stream is separated into a denser and a lighter stream, or into more than two streams of varying densities. Typically, in the case of beneficiating trona, trona is recovered in the lighter stream. The purity of a saline mineral recovered from density separation can be increased by reducing the weight recovery of the recovered stream from the incoming feed stream. At lower weight recoveries, the recovered stream will have a higher purity, but the process will also have a reduced yield because more of the desired saline mineral will report to the impurity stream. Such a "high purity" process may be beneficial in that it requires less subsequent processing (e.g., separation) of the ore and, in addition, may be of higher value because it can be used in other applications where high purity saline minerals are required.

The impurity stream from density separation can go through one or more scavenger density separation step(s) to recover additional trona to improve the overall recovery. The scavenger separation is similar to the above-described density separation step. The scavenger step recovers a portion of the impurity stream from the rougher pass having the saline mineral in it and combines that portion with the above-described recovered stream to increase the overall yield from density separation or recycles it to other steps in the process, with or without further size reduction.

The recovered stream from the initial density separation can go through one or more cleaning density separation steps to further remove impurities from the recovered stream and improve the purity of the final product. The cleaning step is similar to the above-described density separation process in that impurities are removed from the stream by density separation. In both scavenging and cleaning passes, the feed stream into those passes can undergo further size reduction, if desired, for example, to achieve higher liberation.

With regard to the beneficiation of trona, which has an uncalcined density of about 2.14, impurities that are removed during the density separation step may include shortite, having a density of about 2.6, dolomite, having a density of about 2.8–2.9 and pyrite, having a density of about 5.0. Each of these is separable from the trona ore because of differences in density from trona. In addition, in the calcined state, the apparent density of trona decreases, thereby allowing for the removal of impurities such as halite having a density of about 2.17.

Electrostatic separation methods are based on subjecting the ore to conditions such that materials of different electrical conductivities separate from each other. The electrostatic separation of the present invention can be accomplished by any conventional electrostatic separation technique. U.S. Pat. No. 4,341,744 to Brison et al. ("Brison") discloses standard electrostatic separation processes suitable for use in the present invention in col. 4, line 62 through col. 6, line 32, which is incorporated herein by reference in its entirety. As discussed in Brison, saline mineral ore particles are first differentially electrified and then separated into a recovered stream from an impurity stream by various electrostatic separation processes.

As noted above for the density separation step, the impurity stream from the initial pass of an electrostatic separation process can go through a scavenger step to improve the overall recovery. The scavenger step recovers a saline mineral-containing portion of the impurity stream from the rougher pass through electrostatic separation and combines it with the above-described recovered stream to increase the overall yield of the electrostatic separation step or otherwise cycles it to other steps in the process. Furthermore, the recovered stream from the initial pass of the electrostatic separation can go through one or more electrostatic cleaning steps to further remove impurities from the recovered stream and improve the purity of the final product.

For example, electrostatic separation can be used to separate trona from impurities having a higher electrical conductivity, such as shale, mudstone or pyrite. It should be appreciated, however, that electrostatic separation could also be used to separate impurities that have a lower electrical conductivity than the saline mineral being recovered.

Magnetic separation methods subject the ore to conditions such that materials of different magnetic susceptibilities separate from each other into a recovered stream and an impurity stream. The magnetic separation step can be accomplished by any conventional technique, such as induced roll, cross-belt, high intensity rare earth magnetic separation methods, or ultra high intensity magnetic separation. Induced roll may be used in the present invention for the finer fractions and high intensity rare earth magnets are used for the coarser fractions. With regard to the beneficiation of trona, typical impurities that can be removed during the magnetic separation step include shale which has a higher magnetic susceptibility than trona.

As noted above for the density and electrostatic separation steps, the impurity stream from the initial pass of the magnetic separation process can go through one or more scavenger steps to improve the overall recovery. The scavenger step recovers a portion of the impurity stream from the initial pass through magnetic separation and combines it with the above-described recovered stream or recycles it to the process with or without further size reduction to increase the overall yield of the magnetic separation step. Furthermore, the recovered stream from magnetic separation can go through one or more magnetic cleaning steps to further remove impurities from the recovered stream and improve the purity of the final product.

In another embodiment of the present invention, the ore is sized into multiple size fractions prior to the separation steps. Each size fraction is subsequently processed separately. In general, the narrower the range of particle size within a fraction, the higher the efficiency of removal of impurities. On the other hand, a larger number of fractions may also increase the cost of the overall process. The number of size fractions used will likely depend on the size cutoff used for the above-noted size separation step. In general, the smaller the size cutoff, the more fractions that will be utilized.

In another aspect of the present invention, the magnetic separation method has been found to work particularly well with respect to trona if performed after the calcination step as compared to magnetic separation performed before the calcination step. Without being bound to any particular theory, it is believed that the improved performance has to do with the decrease in apparent density of trona that results from the calcination process. For example, when a cross belt magnetic separator is used, this decrease in apparent density appears to cause the non-magnetic material (i.e., the sodium carbonate) to be thrown further horizontally than it would if it were uncalcined trona, thereby resulting in a better separation from the magnetic material.

The wet separation method of the various embodiments of the present invention includes a dissolution and crystallization process. Such a process takes advantage of the fact that the solubilization and crystallization of saline minerals results in more pure crystals because impurities are excluded as crystals are formed after solubilization. In accordance with wet separation processes of the present invention the product recovered thereby is highly pure and can contain greater than about 97 percent by weight (wt. %) soluble material, more preferably greater than about 98 wt. % soluble material and most preferably greater than about 99 wt % soluble material. Further, such product has less than about 0.1 wt. % iron. More preferably, the iron content is at most about 0.08 wt. %, and even more preferably at most about 0.05 wt. %.

In one embodiment of the dissolution and crystallization process, saline mineral crystals are dissolved in water or an unsaturated saline solution. For example, in the case of trona, trona (the sesquicarbonate form of sodium carbonate) or anhydrous sodium carbonate (calcined trona) can be dissolved. Once in solution, water is driven off, and the saline mineral crystallizes. For example, the water can be driven off by heating the solution. However, such a process can be expensive and time-consuming due to the energy required to heat the water and the amount of time required to fully dry the crystals.

Another method to perform dissolution and crystallization in the instance of trona is to perform a process known as the "slush" process. In the slush process, trona is first calcined to produce anhydrous sodium carbonate crystals which are added to a saturated sodium carbonate brine solution. As anhydrous crystals go into solution and recrystallize, they crystallize in the monohydrate form if the temperature is between 35° C. and about 112° C. Accordingly, there is a continuous crystallization process which tends to significantly reduce the impurities in the crystals. Crystals can then be recovered from the brine solution. A specific example of the slush process is disclosed in U.S. Pat. No. 2,887,360 issued May 19, 1959 (Hoekje).

In another embodiment of the combination wet and dry process of the present invention, a process for the production of saline mineral from a feedstream having impurities is provided. The process includes the steps separating a first portion of said feedstream into a first recovered portion and a first impurity portion by a dry separation method, and separating a second portion of said feedstream into a second recovered portion and second impurity portion by a wet separation method, wherein said second portion comprises particles having a particle size larger than about 100 mesh and more preferably, larger than about 65 mesh. The dry separation method is selected from the group consisting of density separation, magnetic separation, electrostatic separation, and combinations thereof. In addition, the wet separation method includes a dissolution and crystallization process. In the instance of trona, this embodiment can further include the step of calcining the trona to form sodium carbonate.

In another embodiment of the combination wet and dry process of the present invention, a process for the production of saline mineral from a feedstream having impurities is provided. This embodiment includes the steps of separating a first portion of impurities by a dry separation method, and separating a second portion of impurities by a wet separation method, wherein at least about 15 weight percent of said feedstream is processed by said wet separation method. The dry separation method is selected from the group consisting of density separation, magnetic separation, electrostatic separation, and combinations thereof. In addition, the wet separation method includes a dissolution and crystallization process. Preferably, the weight percent processed by said wet separation process is at least about 20 percent, and more preferably at least about 30 percent. In the instance of trona, this embodiment can further include the step of calcining the trona to form sodium carbonate.

In yet another aspect, the combination wet and dry process includes separating a first portion of impurities by a dry separation method, and separating a second portion of impurities by a wet separation method, wherein an output of said dry separation method comprises at least about 97 weight percent soluble material and at most about 0.1 weight percent iron. The dry separation method is selected from the group consisting of density separation, magnetic separation, electrostatic separation, and combinations thereof. In addition, the wet separation method includes a dissolution and crystallization process. Preferably, the weight percent of iron present in the output of said dry separation process is at most about 0.08 weight percent iron, and more preferably at most about 0.05 weight percent iron. In the instance of trona, this embodiment can include the step of calcining the trona to produce sodium carbonate.

Further embodiments of the present invention include a modified slush process which provide for high recovery of sodium carbonate compared to known processes. The modified slush process includes introducing sodium carbonate to a saturated sodium carbonate brine solution at a temperature of between about 35° C. and about 112° C. and converting the sodium carbonate to monohydrate crystals. The process further includes separating at least a portion of said monohydrate crystals from at least a portion of said insoluble impurities, wherein the portion of monohydrate crystals includes crystals having a particle size about equal to an average particle size of said insoluble impurities. The temperature of the brine solution for the modified slush process is more preferably between about 35° C. and about 50° C. Typically impurities which can be removed by the modified slush process include iron-bearing materials, dolomite, shale, searlesite and northupite.

Appropriate residence times of sodium carbonate in the brine solution can be selected by those skilled in the art. It should be recognized, however, that longer residence times will result in larger monohydrate crystals which can have significant advantages with respect to recovery. It is believed that residence times of the sodium carbonate in the brine solution could be as little as 15 minutes, but can be as long as 1 or 1.5 hours.

The step of separating monohydrate crystals from insoluble impurities in the modified slush process of the present invention can be accomplished by a variety of suitable methods. Such methods can include size separation, magnetic separation and flotation.

Figure 2:
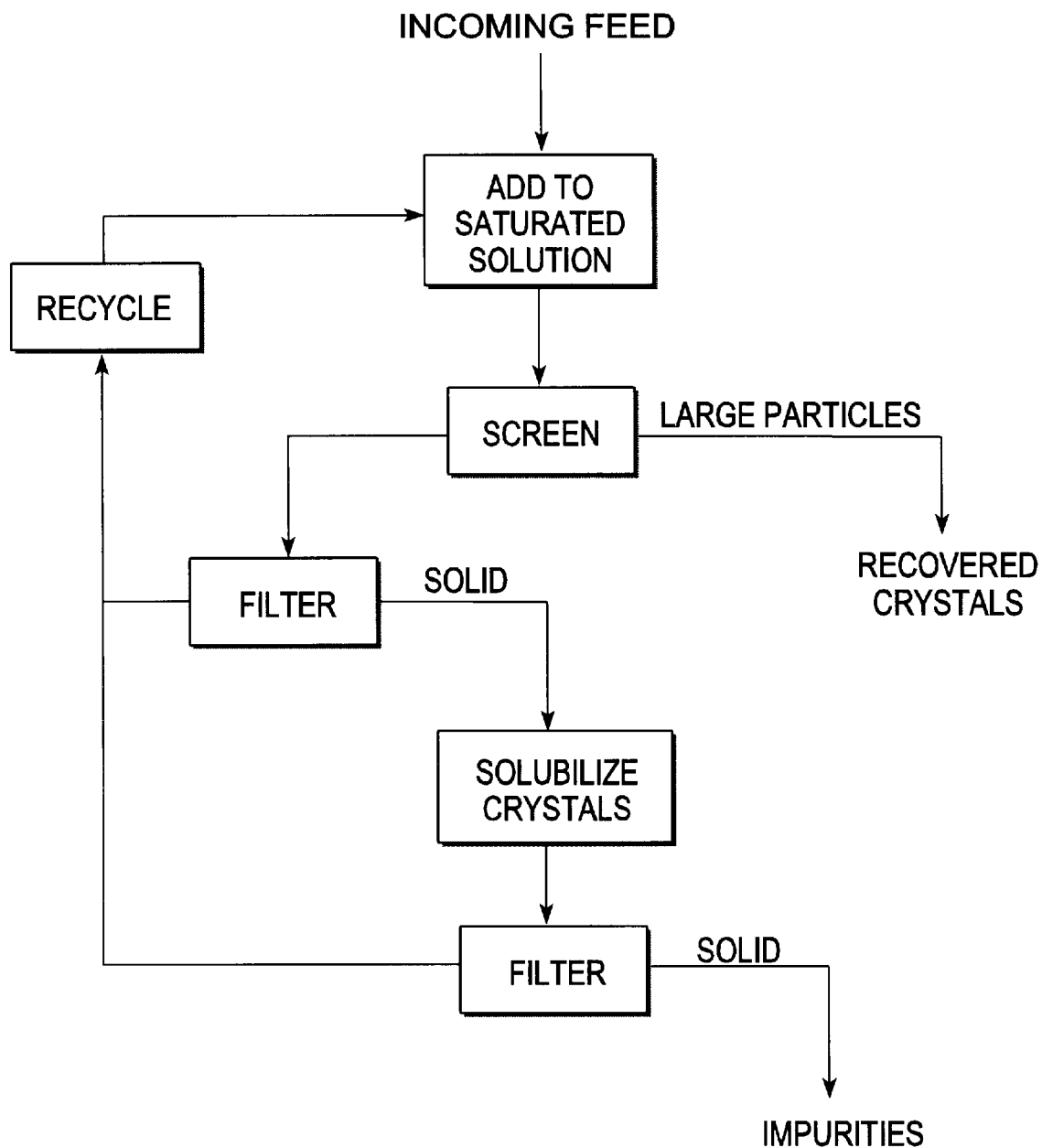
FIG. 2 is a flow diagram illustrating a modified slush process of the present invention for the production of sodium carbonate using size separation.

When the method of separation is size separation, as illustrated in the flow chart of FIG. 2, the process parameters for the modified slush process are such that crystals grow to a size larger than the impurities. For example, the monohydrate crystals may be larger than about 150 mesh, preferably about 100 mesh, and more preferably about 65 mesh. Of course, the desired crystal size will depend in part on the size of the impurities, which depends on the size to which the original feedstream was crushed. In addition, the modified slush process further treats the resulting mixture to separate the impurities from the small crystals.

When the method of separation is size separation, as illustrated in the flow chart of FIG. 2, the modified slush process can include, for example, treating the impurity-containing fraction to recover crystals in the impurity-containing fraction which are smaller than the size separation cutoff. Such a treatment can include filtering the solids from the impurity-containing fraction to form a cake of small crystals and impurities, dissolving the small crystals in water, screening out the impurities, and recycling the solution to the brine solution. Alternatively, the water in the recycle solution could be driven off (e.g., by heating) to recover the sodium carbonate by crystallization.

Figure 3:
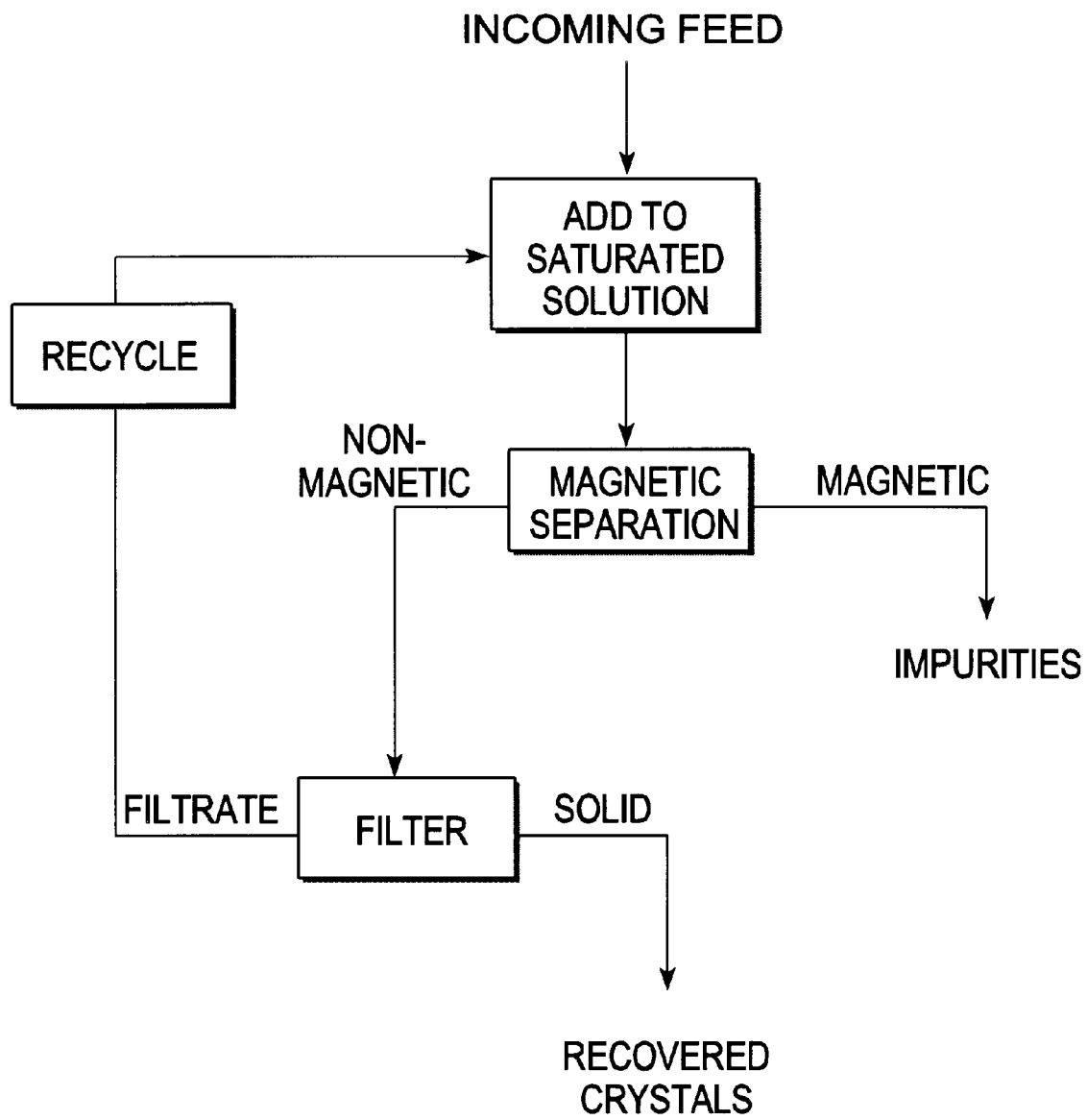
FIG. 3 is a flow diagram illustrating a modified slush process of the present invention for the production of sodium carbonate using magnetic separation.

When the method of separation of impurities in the modified slush process is magnetic separation, as illustrated in FIG. 3, the sodium carbonate crystal-containing stream is subjected to a magnetic flux so that impurities which are magnetically susceptible are removed. For example, a magnetic separation may be performed by a magnetic flux density of at least about 15 Gauss. Preferably, the magnetic flux density is at least about 20 Gauss, and more preferably at least about 30 Gauss. The method of magnetic separation can be wet or dry separation and is preferably wet magnetic separation. Once the impurities are removed, the resulting stream can then be filtered to remove most of the crystals, and the remaining solution can be recycled back to the brine solution or dried to recover the dissolved sodium carbonate.

When the method of separation of impurities in the modified slush process is froth flotation, the sodium carbonate crystal-containing stream is subjected conditions suitable for selectively causing sodium carbonate crystals to float to the surface of the stream, to the exclusion of the impurities. The floating sodium carbonate crystals are then recovered. The remaining stream can then be treated to remove the impurities such as by filtration.

The sodium carbonate in various embodiments of the present invention may further include soluble impurities, in which case such soluble impurities may enter into the brine solution. Such soluble impurities will be excluded from the recovered sodium carbonate crystals, but may build up to undesireable levels in the brine solution. Thus, such soluble impurities can be removed by a variety of suitable methods. For example, a bleed stream can be removed from the saturated brine solution to remove soluble impurities and prevent build up thereof. Further, soluble impurities can be removed from the bleed stream, for example, by use of an activated charcoal filter.

In yet another embodiment of slush processes of the present invention, including the modified slush process, after the sodium carbonate has been introduced into the brine solution and conversion to monohydrate crystals has occurred, the brine solution may be increased in temperature to above about 112° C. to convert monohydrate crystals to anhydrous form. Subsequent cooling of the brine solution converts the anhydrous sodium carbonate back into monohydrate form. Such multiple recrystallization processes assist in further purging the impurities and improving the overall purification process. However, in a preferred embodiment, no such conversion takes place since it is believed than sufficient purity can be obtained without the extra crystallization steps. Avoiding the above-noted heating and crystallization steps reduces the energy required to perform the process of the present invention.

In another aspect of the slush processes of the present invention, including the modified slush process, the brine solution is at a temperature of less than about 35° C. In this aspect, anhydrous sodium carbonate will convert to sodium decahydrate upon introduction into the brine solution. The decahydrate crystals can then be separated from impurities in the manner as described elsewhere herein. If desired, the brine solution can then be heated to a temperature above 35° C. to convert the decahydrate crystals to monohydrate crystals.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiment described hereinabove is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A process for the production of sodium carbonate from a feedstream of trona having impurities comprising the steps of:

(a) crushing said trona to a particle size of less than about 6 mesh;

(b) calcining said trona to produce sodium carbonate and;

(c) magnetically separating a first portion of impurities from said sodium carbonate.

2. A process, as claimed in claim 1, wherein said step of magnetically separating is a dry magnetic separation process.

3. A process, as claimed in claim 2, wherein said process results in a recovery of said sodium carbonate of at least about 97 weight percent and an iron content of at most about 0.1 weight percent.

4. A process, as claimed in claim 1, further comprising the step of density separating a second portion of impurities from said sodium carbonate.

5. A process, as claimed in claim 1, wherein said step of density separating occurs after said step of calcining.

6. A process for the production of sodium carbonate from trona having insoluble impurities comprising the steps of:

(a) crushing said trona to a particle size of less than about 6 mesh;

(b) calcining said trona to produce sodium carbonate;

(c) separating a first portion of impurities by density separation such that materials of different densities separate from each other;

(d) introducing a portion of said sodium carbonate to a saturated sodium carbonate brine solution;

(e) converting said sodium carbonate to monohydrate crystals; and (f) separating at least a portion of said monohydrate crystals from at least a portion of said insoluble impurities.

7. A process, as claimed in claim 6, wherein said step of calcining said trona is conducted before said step of separating a first portion of impurities.

8. A process, as claimed in claim 7, wherein said first portion of impurities comprises an impurity selected from the group consisting of halite and shortite.

9. A process, as claimed in claim 6, wherein said density separation comprises a process selected from the group consisting of air tabling and dry jigging.

10. A process, as claimed in claim 6, wherein said step of separating at least a portion of said monohydrate crystals is a size separation step.

11. A process, as claimed in claim 10, wherein said monohydrate crystals are larger than about 150 mesh.

12. A process, as claimed in claim 6, wherein a temperature of said saturated brine solution is between about 35° C. and about 50° C.

13. A process, as claimed in claim 6, wherein said sodium carbonate introduced into said brine solution further comprises soluble impurities, and wherein said process further comprises the step of treating said brine solution to remove at least a portion of said soluble impurities.

14. A process, as claimed in claim 13, wherein said step of treating said brine solution to remove soluble impurities comprises the step of removing a bleed stream having said soluble impurities from said brine solution.

15. A process, as claimed in claim 14, further comprising removing said soluble impurities from said bleed stream and reintroducing said bleed stream into said brine solution.

16. A process, as claimed in claim 10, wherein said size separation step comprises separating monohydrate crystals having a crystal size larger than a size separation cutoff from a stream comprising said insoluble impurities and small monohydrate crystals having a crystal size smaller than the size separation cutoff, and wherein said process further comprises the step of separating insoluble impurities and said small monohydrate crystals from said stream.

17. A process, as claimed in claim 16, wherein said separated insoluble impurities and small crystals form a cake, and wherein said process further comprises the step of dissolving said small monohydrate crystals from said cake to produce a recycle solution.

18. A process, as claimed in claim 17, further comprising the step of separating said insoluble impurities from said recycle solution.

19. A process for the production of sodium carbonate from trona having impurities, comprising the steps of:

(a) crushing said trona to less than about 6 mesh;

(b) calcining said trona to produce sodium carbonate;

(c) separating a first portion of impurities comprising shortite from said sodium carbonate by density separation such that materials of different densities are separated from each other;

(d) introducing a portion of said sodium carbonate to a saturated brine solution of sodium carbonate;

(e) converting said sodium carbonate to monohydrate crystals; and (f) separating at least a portion of said monohydrate crystals from a second portion of impurities comprising iron-bearing materials.

* * * * *